United States Patent
Ito et al.

(10) Patent No.: US 7,466,119 B2
(45) Date of Patent: Dec. 16, 2008

(54) SENSOR CIRCUIT FOR DETECTION OF AN ABNORMAL OFFSET VOLTAGE

(75) Inventors: Hajime Ito, Ichinomiya (JP); Shunji Mase, Handa (JP); Takao Tsuruhara, Obu (JP)

(73) Assignee: DENSO CORPORATION, Kariya (JP)

( * ) Notice: Subject to any disclaimer, the term of this patent is extended or adjusted under 35 U.S.C. 154(b) by 161 days.

(21) Appl. No.: 11/500,303

(22) Filed: Aug. 8, 2006

(65) Prior Publication Data

US 2007/0041135 A1    Feb. 22, 2007

(30) Foreign Application Priority Data

Aug. 22, 2005    (JP) .............................. 2005-240098

(51) Int. Cl.
  *G01D 1/14*    (2006.01)
  *G01R 27/08*   (2006.01)
(52) U.S. Cl. .................................... 324/76.13; 324/713
(58) Field of Classification Search ............... 324/76.13
  See application file for complete search history.

(56) References Cited

U.S. PATENT DOCUMENTS

| | | | | |
|---|---|---|---|---|
| 4,398,154 A * | 8/1983 | Lee | ............................ | 327/174 |
| 4,801,827 A * | 1/1989 | Metz | ........................... | 327/280 |
| 6,246,268 B1 * | 6/2001 | Cheng | ........................... | 327/65 |
| 6,666,090 B2 * | 12/2003 | Mori et al. | ................ | 73/504.02 |
| 7,129,487 B2 * | 10/2006 | Hatatani et al. | ........... | 250/338.3 |
| 2006/0077013 A1 | 4/2006 | Tsuruhara et al. | | |

FOREIGN PATENT DOCUMENTS

JP    A-08-077714    3/1996
JP    A-2001-304871   10/2001

* cited by examiner

*Primary Examiner*—Diego Gutierrez
*Assistant Examiner*—Jeff Natalini
(74) *Attorney, Agent, or Firm*—Posz Law Group, PLC

(57) ABSTRACT

A sensor circuit includes an AC component pickup circuit and first and second adder circuits or first and second high-pass filters, and specifies a range of normal voltages by an upper-limit voltage formed by adding an upper-limit threshold value to the AC component in the input voltage and by a lower-limit voltage formed by adding a lower-limit threshold value to the AC component in the input voltage. An abnormal offset voltage is detected by judging whether the output voltage of an inverting amplifier circuit is lying in the range of normal voltages.

4 Claims, 6 Drawing Sheets

SENSOR CIRCUIT FOR DETECTION OF AN ABNORMAL OFFSET VOLTAGE

CROSS REFERENCE TO RELATED APPLICATION

This application is based on and incorporates herein by reference Japanese Patent Application No. 2005-240098 filed on Aug. 22, 2005.

FIELD OF THE INVENTION

This invention relates to a sensor circuit, which is capable of detecting abnormal offset voltage in a sensor output.

BACKGROUND OF THE INVENTION

A conventional sensor device such as a gyro sensor is equipped with a pair of right and left vibrators and an electronic sensor circuit. In the sensor circuit, detection signals of the vibrators are applied to a voltage conversion circuit through a charge amplifier and to a differential amplifier circuit to obtain a differential output of the detection signals. The differential output is, then, applied to a synchronous detector circuit, a low-pass filter (hereinafter, LPF) and a zero point/sensitivity adjusting circuit so as to be used as a sensor output.

In the above sensor circuit, the differential output of the differential amplifier circuit is so set as to assume a predetermined value depending upon the purposes of using the sensor device. Here, however, the offset voltage of the differential output becomes often abnormal. For example, the offset voltage becomes abnormal in case a bonding wire, which electrically connects the vibrators to the charge amplifier, is broken.

Therefore, there another sensor circuit is proposed to have an abnormal condition detector circuit for detecting an offset voltage that becomes abnormal based on the differential output. Specifically, this circuit is constructed as shown in FIG. 6, wherein an input signal VIN represents a differential output of the above differential amplifier circuit and is an AC signal.

As shown, the input signal is fed to an LPF 100 and a window comparator 101, where the input signal is compared with an upper-limit threshold value VRH and a lower-limit threshold value VRL. No diagnosis signal is output when the signal that has passed through the LPF lies in a range between the upper-limit threshold value VRH and the lower-limit threshold value VRL. A diagnosis signal is output when the signal is outside the above range.

In the above conventional sensor circuit, in which the differential output that becomes an AC signal is smoothed through the LPF. The time constant of the LPF is set large, and hence detection of an abnormal offset voltage is delayed. Thus, it is not possible to detect the offset voltage that becomes abnormal only temporarily and converges within a time constant. These problems will now be described in detail with reference to FIGS. 7 and 8.

FIGS. 7 and 8 illustrate in detail the circuit constructions of abnormal condition detector circuits provided for the conventional sensor circuit shown in FIG. 6. In FIG. 7, the LPF 100 is of the non-inverting type and includes an amplifier 100a, a resistor RLPF and a capacitor CLPF. In FIG. 8, the LPF 100 is of the inverting type and includes an amplifier 100a, resistors RI, RF, a capacitor CF and a reference voltage source VREF.

If the amplitude of the input signal VIN is denoted as Va, its DC component as Vdc, its frequency as fd and its angular frequency as ωd, then, the angular frequency ωd is expressed as follows.

$$\omega d = 2 \cdot \pi \cdot fd \quad (1)$$

Therefore, the input signal VIN can be expressed as follows.

$$VIN(t) = Va \cdot \sin(\omega d \cdot t) + Vdc \quad (2)$$

The DC component Vdc is used for detecting abnormality in the offset voltage. In FIGS. 7 and 8, if the output voltage of the LPF 100 is denoted as VLPF and the voltage used as a reference voltage of LPF 100 in FIG. 8 is denoted as VREF (usually, VREF=VCC/2), the VLPF becomes as given below depending upon whether the LPF 100 is of the non-inverting type or of the inverting type.

In the case of the non-inverting type:

$$VLPF = Vdc \quad (3)$$

In the case of the non-inverting type:

$$VLPF = 2 \cdot VREF - Vdc \quad (4)$$

These voltages are input to the window comparator 101 and are compared by two comparators 101a, 101b incorporated therein with the voltage VRH and with the voltage VRL. Here, the voltages VRH and VRL are provided by dividing a power source voltage VCC by voltage-dividing resistors 101d to 101f provided in the window comparator 101. The voltage VRL is lower than the voltage VRH. The comparator 101a produces a low level when VLPF becomes higher than the voltage VRH, while the comparator 101b produces a low level when VLPF becomes lower than the voltage VRL. Therefore, if either one of the comparator 101a or 101b produces the low level due to too high or too low VLPF, the AND circuit 101c produces a low level as a diagnosis signal indicating an abnormality.

The voltage VLPF relative to the input signal in FIGS. 7 and 8 is shown in FIG. 9. It is determined whether a difference ΔVdc between VLPF and VREF is in a range of voltages VRL to VRH (range of normal voltages) set with VREF.

In this abnormal condition detector circuit, it is desired that ripples (fd component) remaining after the smoothing dwindle. Further, the cut-off frequency fc of LPF 100 must be smaller than the frequency fd of input signals. It is, therefore, required to increase the time constant of LPF 100 resulting in a delay in detecting the abnormal offset voltage and, besides, making it difficult to detect the offset voltage that becomes abnormal only temporarily and converges within short periods of time of not longer than the time constant.

SUMMARY OF THE INVENTION

It is therefore a first object of the present invention to provide a sensor circuit capable of preventing a delay in detecting an abnormal voltage.

It is a second object of the invention to provide a sensor circuit capable of detecting a voltage that becomes abnormal only temporarily and converge within short periods of time.

In one aspect of the present invention, an input signal is provided based on a detection signal output and an AC component in the input signal is picked up. An upper-limit voltage is provided by adding an upper-limit threshold value to the AC component. A lower-limit voltage is provided by adding a lower-limit threshold value smaller than the upper-limit threshold value to the AC component. An abnormal voltage is detected depending upon whether the input signal is in a range between the upper-limit voltage and the lower-limit voltage.

With the above processing, it is possible to detect an abnormal voltage without increasing a time constant of a low pass filter. It is thus possible to prevent a delay at the time of detecting an abnormal voltage and is capable of detecting a voltage that becomes abnormal only temporarily and converges within a time constant.

Here, it is determined whether the input signal is within the range of normal voltages. As required, however, it may be determined whether the input signal amplified by a predetermined amplification factor is lying within the range of normal voltages.

In one example, outputs of a differential amplifier are used as input signals, i.e., first and second detection signals generated by a sensor are put to voltage conversion through first and second voltage converters, and a difference thereof is used as the input signal.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENTS

First Embodiment

Figure 1:
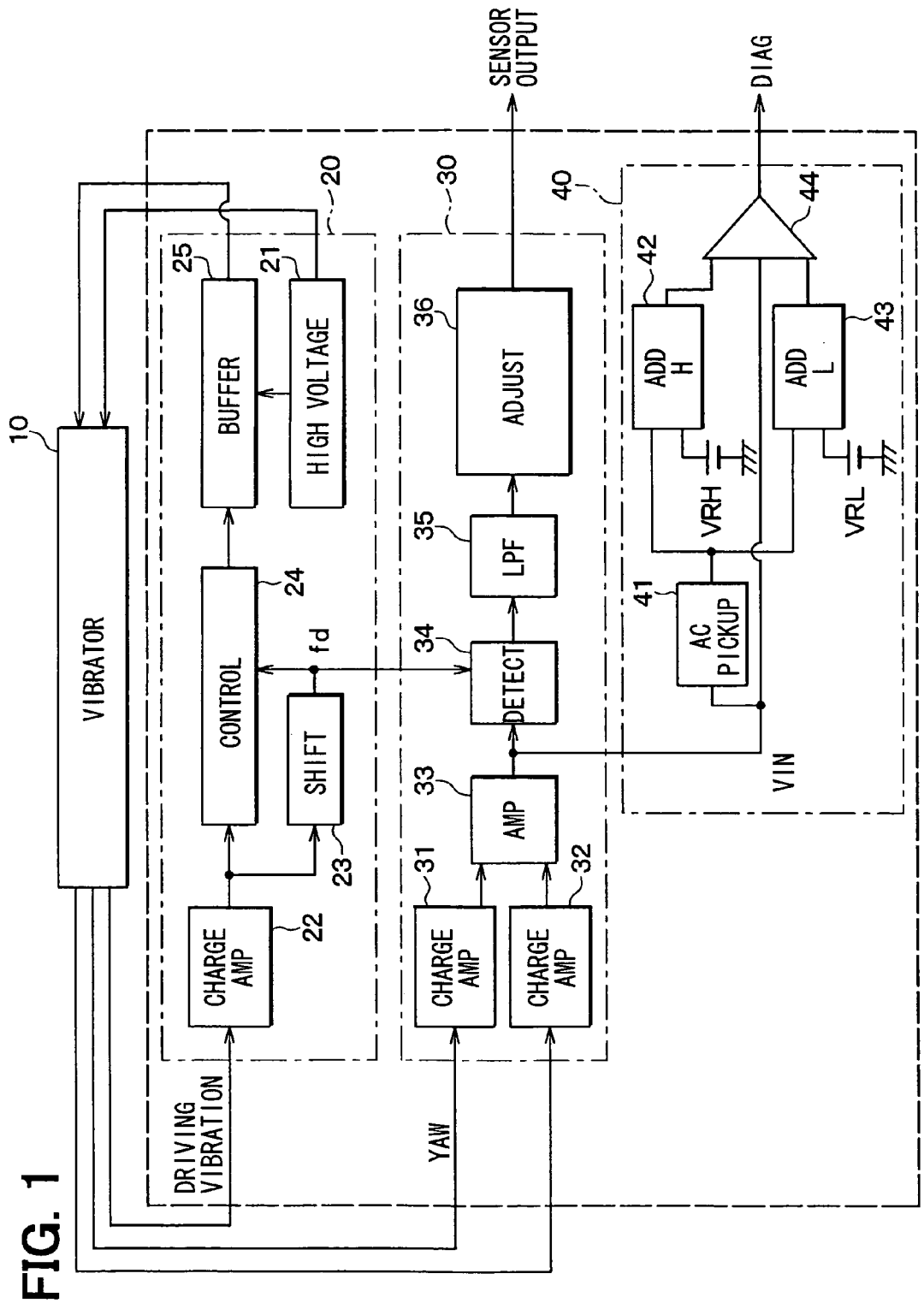
FIG. 1 is a circuit diagram illustrating a sensor circuit according to a first embodiment of the invention.

Referring to FIG. 1, a sensor circuit is constructed with a vibrator 10, a drive circuit 20, a yaw detector circuit 30 and an abnormal condition detector circuit 40.

The vibrator 10 is a sensor for detecting physical quantity and includes a sensor element (not shown) that moves on a plane. When there takes place a rotation about an axis at right angles with the moving plane while the sensor element is driven and is vibrated, the sensor element also vibrates in a direction at right angles with the direction of driving vibration due to Coriolis force. The vibrator 10 generates outputs (first and second detection signals) corresponding to vibration by Coriolis force, and generates an output corresponding to the driving vibration to detect whether the sensor element is properly vibrated.

The drive circuit 20 is for vibrating the sensor element in the vibrator 10. The drive circuit 20 includes a high voltage generator circuit 21, a charge amplifier 22, a phase shifter 23, an amplitude control unit 24 and a drive buffer 25.

The high voltage generator circuit 21 boosts a power source voltage to generate a bias voltage higher than the power source voltage. The bias voltage is fed as a power source to the drive buffer 25 as well as to the sensor element.

The charge amplifier 22 receives, from the vibrator 10, detection signals (hereinafter referred to as driving vibration detection signals) corresponding to the driving vibration of the sensor element in the vibrator 10, and converts them into voltages. The driving vibration detection signals after being subjected to the voltage conversion through the charge amplifier 22 are input to the amplitude control unit 24 and to the phase shifter 23.

The phase shifter 23 is for adjusting the phase of the driving signal. It is desired that the amplitude of the driving vibration is as great as possible from the standpoint of improving the S/N ratio of the sensor. Therefore, the sensor element is driven at a resonance frequency of the sensor element. When driven at the resonance frequency, the displacement of the sensor element or the driving vibration detection signal is delayed in phase by 90 degrees with respect to the driving force, i.e., with respect to the driving signal. To restore the deviation in the phase, the phase of the driving vibration detection signal must be adjusted to meet the phase of the driving signal. Therefore, the phase of the driving vibration detection signal is corrected by the phase shifter 23 to thereby adjust the phase of the driving signal that is formed based thereupon. Further, the resonance frequency of the sensor element becomes a frequency fd of the driving signals.

The amplitude control unit 24 detects the present amplitude of the sensor element from the driving vibration detection signal, and outputs, to the drive buffer 25, AC signals to generate driving signals of which the amplitude becomes constant.

The drive buffer 25 amplifies the signal output from the amplitude control unit 24. The output is applied as a driving signal to the sensor element.

The yaw detector circuit 30 is for obtaining a sensor output based on the detection signal from the vibrator 10. The yaw detector circuit 30 includes two charge amplifiers 31, 32, a differential amplifier circuit 33, a synchronous detector circuit 34, an LPF 35 and a 0-point/sensitivity adjusting circuit 36.

The two charge amplifiers 31 and 32 receive detection signals (hereinafter referred to as yaw detection signals) corresponding to the vibration, that generate when the sensor element is rotated about an axis at right angles with the moving plane, convert them into voltages, and correspond to the first and second voltage conversion means, respectively. The yaw detection signals after subjected to the voltage conversion through the charge amplifiers are input to the differential amplifier circuit 33.

The differential amplifier circuit 33 generates a differential output of the yaw detection signals subjected to the voltage conversion through the charge amplifiers 31 and 32. The differential output of the differential amplifier circuit 33 is input to the synchronous detector circuit 34 and is further input to the abnormal condition detector circuit 40. The differential output of the differential amplifier circuit 33 becomes an AC signal containing a predetermined offset voltage which is a DC component.

Based on the phase adjusted by the phase shifter 23, the synchronous detector circuit 34 permits the passage of components in synchronism with the frequency fd from the differential output of the differential amplifier circuit 33, and outputs them to the LPF 35.

The LPF 35 picks up only those components lower than a predetermined frequency out of the signals that have passed through the synchronous detector circuit 34.

The 0-point/sensitivity adjusting circuit 36 amplifies and adjusts the signals that have passed through the LPF 35 so as to acquire a desired 0-point/sensitivity and, as required, further adjusts the temperature characteristics of 0-point/sensitivity. The signals after being amplified and adjusted through the 0-point/sensitivity adjusting circuit 36 are used as sensor outputs.

The abnormal condition detector circuit 40 is to detect an abnormal offset voltage. The abnormal condition detector circuit 40 includes an AC component pickup circuit 41, first and second adder circuits 42 and 43, and a window comparator 44.

The AC component pickup circuit 41 is for picking up or extracting AC components only in the input signals. That is, the output signals of the differential amplifier circuit 33 are AC signals containing a predetermined offset voltage that is a DC component. Therefore, the predetermined offset voltage that is the DC component is removed to pick up the AC components only.

The first adder circuit 42 adds, to the AC component picked up by the AC component pickup circuit 41, an upper-limit threshold value VRH that is set to be relatively high to specify an upper-limit voltage of the range of normal voltages. The second adder circuit 43 adds, to the AC component picked up by the AC component pickup circuit 41, a lower-limit threshold value VRL that is set to be relatively low to specify a lower-limit voltage of the range of normal voltages. The upper-limit threshold value VRH added by the first adder circuit 42 has been set to be a value higher than the lower-limit value VRL added by the second adder circuit 43. A difference between the upper-limit threshold value VRH and the lower-limit threshold value VRL serves as a width for specifying the range of normal voltages.

The window comparator 44 is used as judging means for comparing the input signal with the outputs of the first and second adder circuits 42, 43, i.e., for comparing the input signal with a voltage obtained by adding the upper-limit threshold value VRH or the lower-limit threshold value VRL to the AC component in the input signal. When the input signal lies in the range between the output voltages of the first and second adder circuits 42 and 43, no diagnosis signal is output from the window comparator 44. When the input signal lies outside the above range, a diagnosis signal is output from the window comparator 44.

Figure 2:
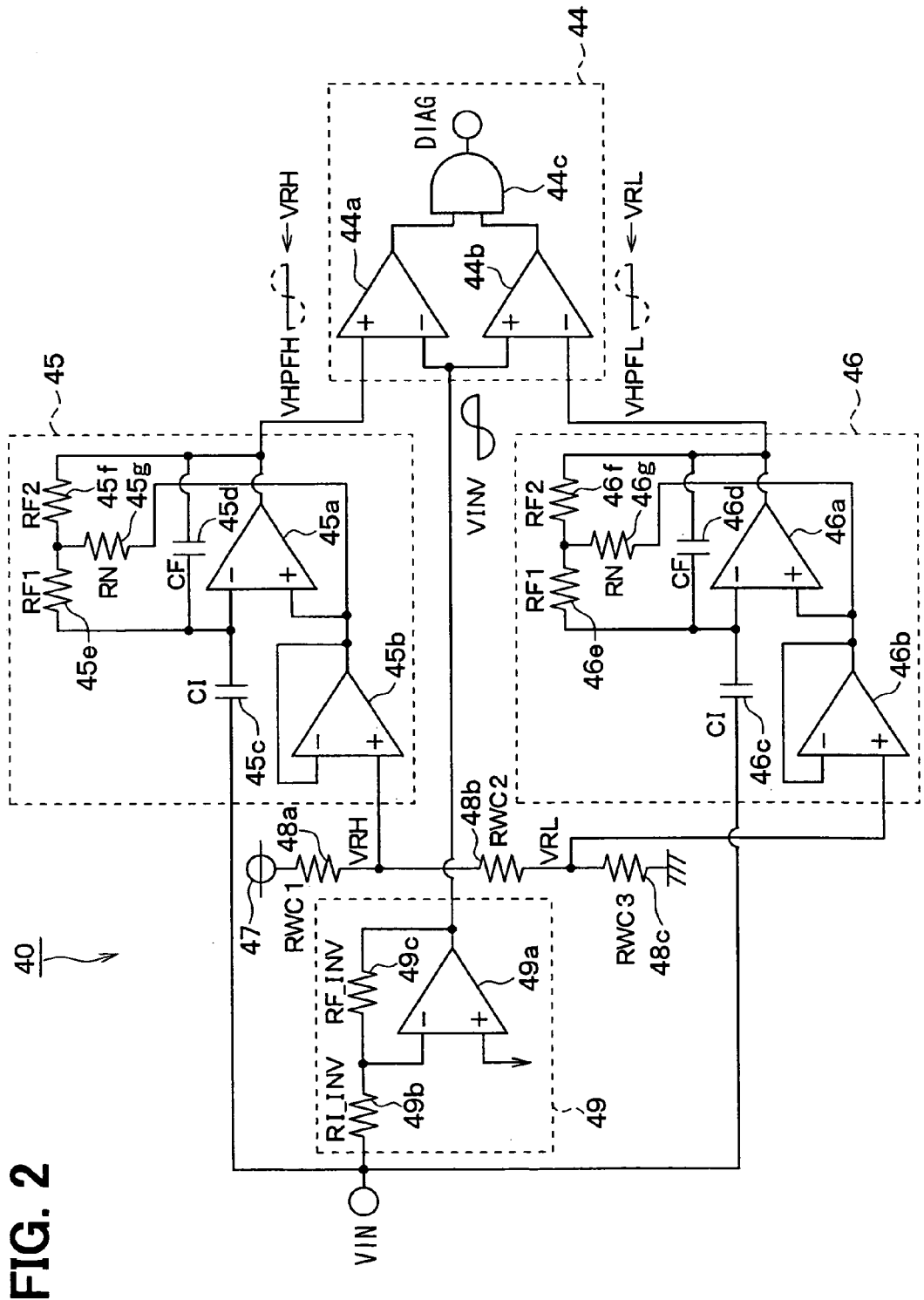
FIG. 2 is a circuit diagram illustrating an abnormal condition detector circuit in the sensor circuit shown in FIG. 1.

As shown in FIG. 2, the abnormal condition detector circuit 40 includes first and second high-pass filters 45 and 46. The first and second high-pass filters 45 and 46 also work as the AC component pickup circuit 41 and as the first and second adder circuits 42, 43.

The first high-pass filter 45 includes first and second operational amplifiers 45a and 45b, first and second capacitors 45c and 45d, and first to third resistors 45e to 45g. The first operational amplifier 45a receives at the inverting input terminal thereof the input signal VIN through the first capacitor 45c and receives at the non-inverting input terminal thereof the upper-limit threshold value VRH through the buffer circuit constructed with the second operational amplifier 45b. As the upper-limit threshold value VRH, there is used a voltage obtained by dividing the power source 47 by resistors 48a to 48c or, specifically, a voltage (VCC·(RWC2+RWC3)/(RWC1+RWC2+RWC3)) specified by the resistances RWC1 to RWC3 of the resistors 48a to 48c.

Further, the second capacitor 45d is connected between the output terminal and the inverting input terminal of the first operational amplifier 45a, and the first and second resistors 45e and 45f are connected in parallel with the second capacitor 45d. Through the third resistor 45g, an output voltage of the second operational amplifier 45b is input to a node between the first resistor 45e and the second resistor 45f.

An upper-limit voltage VHPFH obtained by adding the upper-limit value VRH to the AC component of the input signal is produced as the output voltage of the first operational amplifier 45a. Here, the upper-limit voltage VHPFH has a phase which is inverted from the phase of the AC component of the input signal.

The second high-pass filter 46 basically has the same construction as that of the first high-pass filter 45. That is, the first and second operational amplifiers 46a and 46b, the first and second capacitors 46c and 46d, and the first to third resistors 46e to 46g are constructed in the same manner as those of the above first high-pass filter 45. Here, however, the first operational amplifier 46a receives through the non-inverting input terminal thereof the lower-limit threshold value VRL through the buffer circuit constructed with the second operational amplifier 46b and, hence, produces a lower-limit voltage VHPFL obtained by adding the lower-limit threshold value VRL to the AC component of the input signal as the output voltage of the first operational amplifier 46a. Here, the lower-limit voltage VHPFL, too, has a phase inverted from the phase of the AC component of the input signal.

As the lower-limit threshold value VRL, there is used a voltage obtained by dividing the power source 47 by resistors 48a to 48c or, specifically, a voltage (VCC·(RWC3)/(RWC1+RWC2+RWC3)) specified by the resistances RWC1 to RWC3 of the resistors 48a to 48c.

The window comparator 44 includes two comparators 44a and 44b, and an AND circuit 44c.

In the window comparator 44, the two comparators 44a and 44b compare the input signal with the upper-limit voltage VHPFH output from the first high-pass filter 45 or compare the input signal with the lower-limit voltage VHPFL output from the second high-pass filter 46.

In this sensor circuit, however, the abnormal condition detector circuit 40 is provided with an inverting amplifier 49 which amplifies the input signal VIN at a predetermined amplification factor. The input signal after amplified is used as an abnormal condition detection signal. Specifically, the inverting amplifier 49 includes an operational amplifier 49a and resistors 49b and 49c, and amplifies the input signal by an amplification factor determined by resistances RI_INV and RF_INV of the resistors 49b and 49c. Therefore, window comparator 44 compares the abnormal condition detection signal, which is the input signal after amplified through the inverting amplifier 49.

Here, though the input signal is amplified through the inverting amplifier 49, it is also allowable to directly use the input signal that has not been amplified as the abnormal condition detection signal. As described above, however, the upper-limit voltage VHPFH and the lower-limit voltage VHPFL have phases inverted from the phases of the input signals. When the first and second high-pass filters 45 and 46 are used, therefore, the phases of the input components must be inverted by using the inverting amplifier 49. Further, the amplification factor of the inverting amplifier 49 is brought into agreement with the amplification factor for the AC component through the first and second high-pass filters 45 and 46. The upper-limit threshold value VRH and the lower-limit threshold value VRL are set depending upon the amplification factor of the inverting amplifier 49.

The comparator 44a produces a low level when the voltage of the abnormal condition detection signal becomes higher than the upper-limit voltage VHPFH and the comparator 44b produces a low level when the voltage of the abnormal condition detection signal becomes lower than the voltage VHPFL. Therefore, when either one of the comparator 44a or 44b assumes the low level, the AND circuit 44c produces a low level as a diagnosis signal, which indicates an abnormality.

In this embodiment, the sensor circuit may be the one that is conventionally used except the abnormal condition detector circuit 40. Therefore, the operation of the abnormal condition detector circuit 40 will be described in detail.

First, a differential output generated by the differential amplifier circuit 33 in the yaw detector circuit 30 is fed as the input signal VIN to the first and second high-pass filters 45 and 46. The first and second high-pass filters 45 and 46 generate outputs corresponding to the input signal.

Here, if the capacitances of the second capacitors 45d and 46d are denoted with CF and the angular frequency of the input signals is denoted with $\omega d$, an equivalent resistance RF or an absolute value $|ZF|$ of an equivalent impedance of a circuit network such as of resistors connected in parallel with the second capacitors 45d and 46d in the first and second high-pass filters 45 an 46, is so set as to satisfy the following relation, $$RF, |ZF|>>1/(\omega d \cdot CF) \qquad (5)$$

In the buffer circuits constructed with the second operational amplifiers 45b and 46b, further, a stable voltage having a low impedance equal to the upper-limit threshold value VRH or the lower-limit threshold value VRL can be given to the terminals of the third resistors 45g and 46g on the ends that are not connected to the first and second resistors 45e, 45f, 46e, 46f.

Therefore, if the capacitance of the first capacitor 45c is denoted with CI and the amplitude of the input signal VIN with Va, the upper-limit voltage VHPFH produced by the first high-pass filter 45 is expressed as follows. Hence, the amplitude of the AC component in the input signal becomes (CI/CF) times as great, the phase is inverted, and the DC component becomes the upper-limit threshold value VRH, $$VHPFH(t)=-(CI/CF)\cdot Va\cdot\sin(\omega d\cdot t)+VRH \qquad (6)$$

Similarly, if the capacitance of the first capacitor 46c is denoted with CI, the lower-limit voltage VHPFL output by the second high-pass filter 46 becomes as expressed as follows. Hence, the amplitude of the AC component in the input signal becomes (CI/CF) times as great, the phase is inverted, and the DC component becomes the lower-limit threshold value VRL, $$VHPFL(t)=-(CI/CF)\cdot Va\cdot\sin(\omega d\cdot t)+VRL \qquad (7)$$

Concerning the inverting amplifier 49, the output voltage VINV(t) is expressed as follows by using the input voltage VIN(t) and a reference voltage VREF of the operational amplifier 49a, $$VINV(t)=-(RF\_INV/RI\_INV)\cdot(VIN(t)-VREF)+VREF \qquad (8)$$

If the formula (2) is substituted into the formula (8) and the formula (8) is rearranged, the following formula is obtained, where Vdc is a DC component in the input signal, $$VINV(t)=-(RF\_INV/RI\_INV)\cdot Va\cdot\sin(\omega d\cdot t)+(RF\_INV/RI\_INV)\cdot(VREF-Vdc)+VREF \qquad (9)$$

Therefore, if the circuit constants are so set as to satisfy the following relation, then the output voltage VINV(t) of the inverting amplifier circuit 49, the upper-limit voltage VHPFH(t) of the first high-pass filter 45 and the lower-limit voltage VHPFL(t) of the second high-pass filter 46 have the AC components of the same amplitude and the same phase. Further, the voltages (e.g., output voltage VINV(t), the upper-limit voltage VHPFH(t) and the lower-limit voltage VHPFL(t)) compared by the window comparator 44 have the AC components of the same amplitude and the same phase, but have DC components that are not the same.

$$(CI/CF)=(RF\_INV/RI\_INV) \qquad (10)$$

In the window comparator 44, therefore, the DC component of the output voltage VINV(t) of the inverting amplifier circuit 49 or the DC component Vdc of the input signal VIN(t) can be compared with the upper-limit threshold value VRH and with the lower-limit threshold value VRL.

Figure 3:
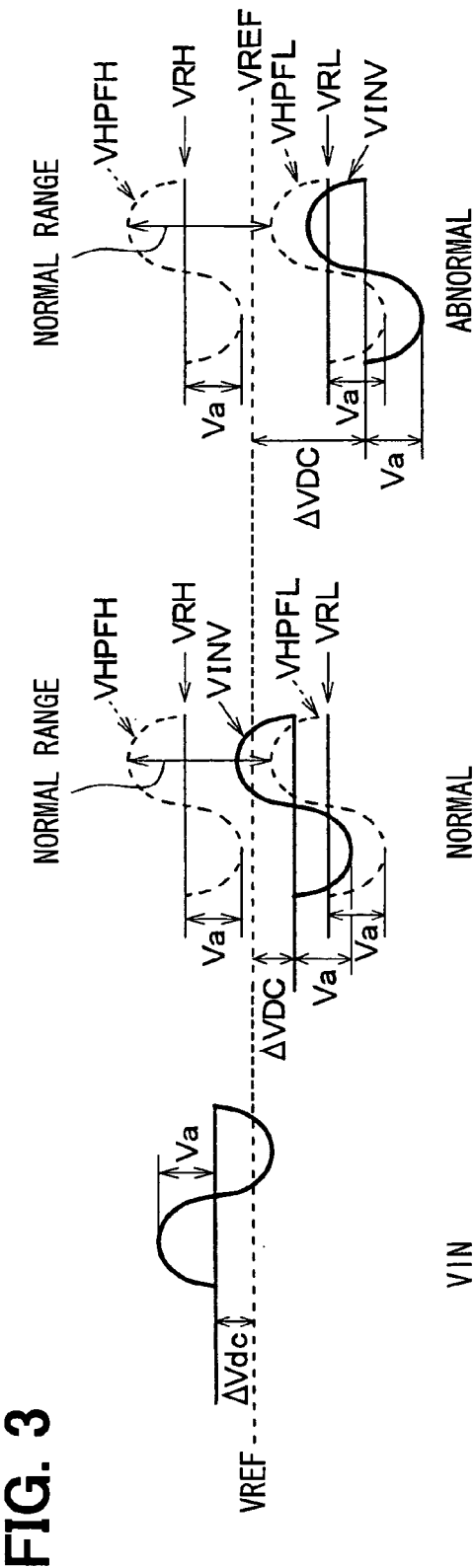
FIG. 3 is a signal diagram showing a relationship between outputs of HPFs and an input signal in cases that the input signal is normal and abnormal.
Figure 9:
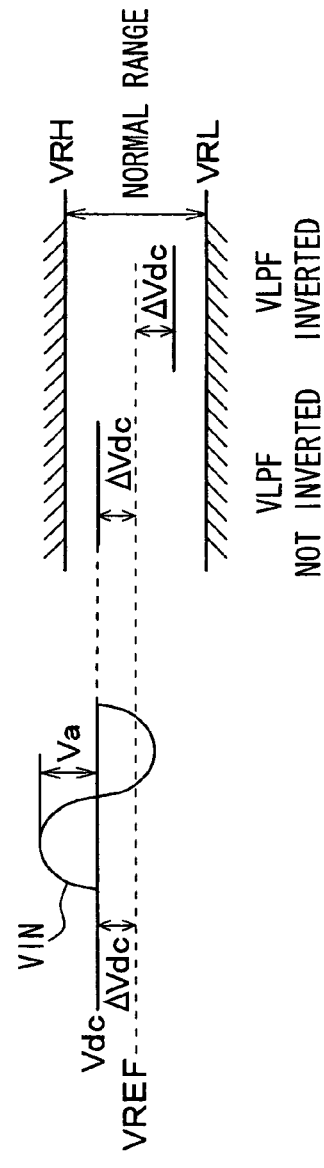
FIG. 9 is a signal diagram illustrating a relationship between VLPF and an input signal in the conventional sensor circuit.

That is, when the input signal VIN has an offset voltage $\Delta Vdc$ relative to the reference voltage VREF, the waveforms of the output voltage VINV(t) of the inverting amplifier circuit 49, the upper-limit voltage VHPFH(t) of the first high-pass filter 45 and the lower-limit voltage VHPFL(t) of the second high-pass filter 46 become as shown in FIG. 3 under a normal condition and an abnormal condition. For simplicity in FIG. 3, it is assumed CI/CF=RF_INV/RI_INV=1.

As shown, the range of normal voltages is specified by the upper-limit voltage VHPFH and by the lower-limit voltage VHPFL that are formed by adding the upper-limit threshold value VRH or the lower-limit value VRL to the AC component of the input voltage VIN, and the output voltage VINV(t) of the inverting amplifier circuit 49 is compared with the upper-limit voltage VHPFH and with the lower-limit voltage VHPFL to thereby substantially compare the DC component Vdc of the input signal VIN(t) with the upper-limit threshold value VRH and with the lower-limit threshold value VRL.

As described above, this embodiment is equipped with the AC component pickup circuit 41 and first and second adder circuits 42, 43 or, in other words, first and second high-pass filters 45, 46, and defines the range of normal voltages by the upper-limit voltage VHPFH and by the lower-limit voltage VHPFL formed by adding the upper-limit threshold value VRH or the lower-limit threshold value VRL to the AC component of the input voltage VIN. An offset voltage which is abnormal can be detected depending upon whether the output voltage VINV(t) of the inverting amplifier circuit 49 is included in the range of normal voltages.

Since the above construction makes it possible to detect abnormal offset voltage, there is no such limitation as to increase the time constant of the LPF unlike that of the prior art. Therefore, no delay occurs in detecting the abnormal offset voltage. Thus, a sensor circuit is realized to be capable of detecting an offset voltage that temporarily becomes abnormal and converges within a time constant.

In the abnormal condition detector circuit 40 shown in FIG. 2, further, the circuit constructed with the first to third resistors 45e to 45g must have a very increased equivalent impedance RF in view of the above formula (5). In the case of the circuit construction shown in FIG. 2, for example, the formula becomes as given below when the resistances of the first to third resistors 45e to 45g are denoted by RF1, RF2 and RN. Therefore, if RN is decreased, then, RF1 and RF2 may be small. Therefore, upon fabricating the first to third resistors 45e to 45g in an integrated circuit (IC) chip, the area occupied thereby can be decreased.

$$RF=(RF1\cdot RF2/RN)+RF1+RF2 \qquad (11)$$

Second Embodiment

Figure 4:
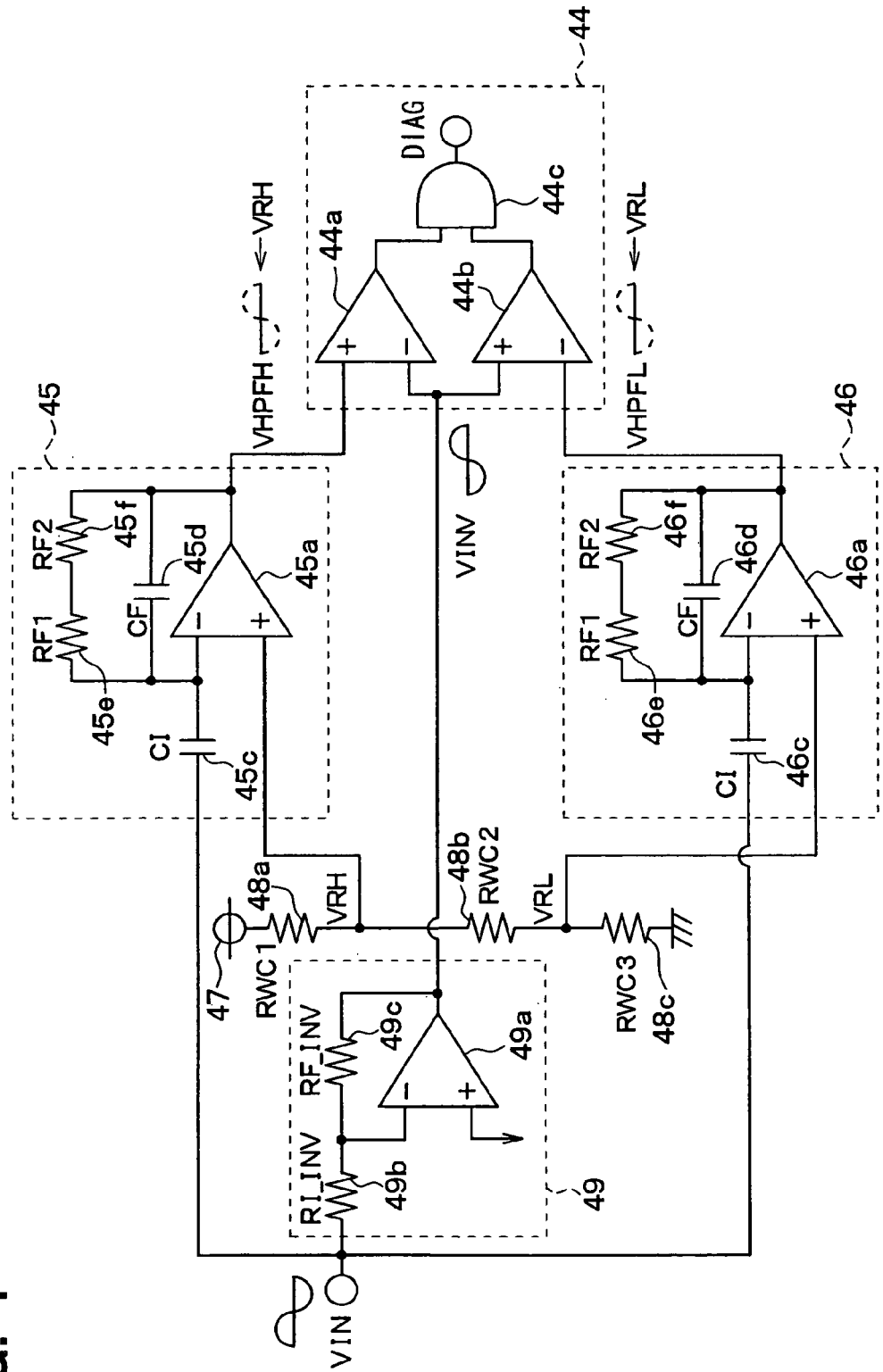
FIG. 4 is a circuit diagram illustrating an abnormal condition detector circuit in the sensor circuit according to a second embodiment of the invention.

In the second embodiment shown in FIG. 4, the sensor circuit has a similar construction as the first embodiment. In the above first embodiment, the outputs of the first operational amplifiers 45a and 46a in the first and second high-pass filters 45 and 46 are fed back to the DC potential (i.e., to the upper-limit threshold value VRH or to the lower-limit threshold value VRL) through the second and third resistors 45f, 45g, 46f, 46g. Therefore, the input offset voltage of the first operational amplifiers 45a and 46a are amplified into (1+RF2/RN) times and are output from the first operational amplifiers 45a and 46a. This may reduce the precision for detecting the DC component in the input signal VIN. The second embodiment, therefore, provides a circuit, which improves this point.

Referring to FIG. 4, the first and second resistors 45e, 45f, 46e, 46f only are connected in parallel with the second capacitors 45d, 46d. Namely, the third resistors 45g, 46g provided in the first embodiment are removed. Further, the second operational amplifiers 45b, 46b constituting the buffer circuits in the first embodiment are removed.

To satisfy the relationship of the above formula (5) in this construction, the resistances RF1, RF2 of the first and second resistors 45e, 45f, 46e, 46f are so selected as to satisfy the following relation, $$RF1+RF2 \gg 1/(\omega d \cdot CF) \cdot (12)$$

In the case of this construction, the resistances RF1 and RF2 must be very much increased. Here, however, since there is no third resistor 45g that is used in the first embodiment, no buffer circuit has to be provided the second operational amplifiers 45b, 46b, and the circuit is simplified. Besides, the input offset voltages of the first operational amplifiers 45a, 46a are not amplified.

Third Embodiment

Figure 5:
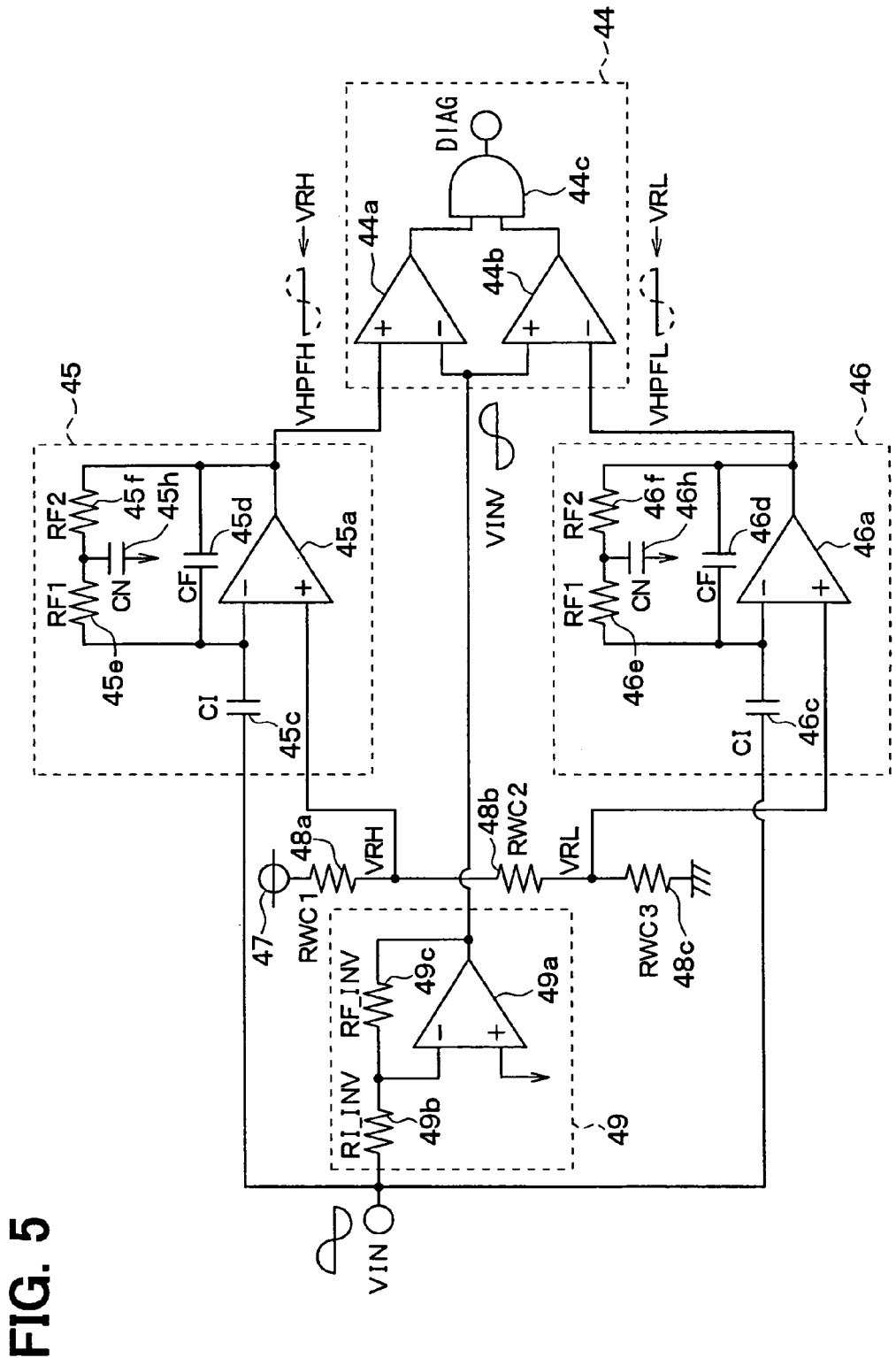
FIG. 5 is a circuit diagram illustrating an abnormal condition detector circuit in the sensor circuit according to a third embodiment of the invention.
Figure 6:
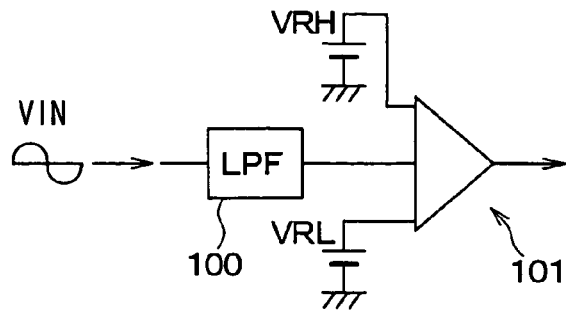
FIG. 6 is a circuit diagram illustrating a conventional abnormal condition detector circuit.
Figure 7:
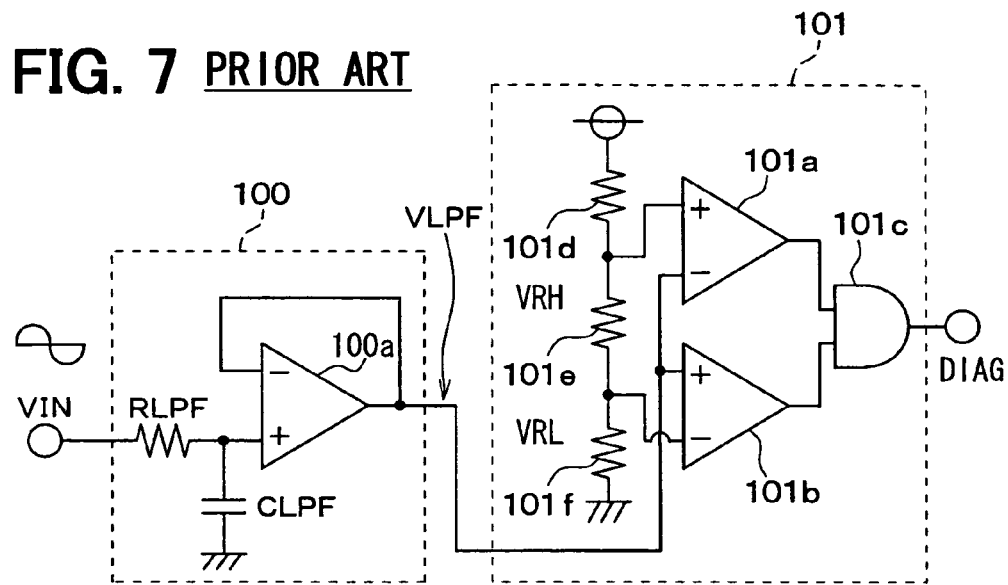
FIG. 7 is a circuit diagram illustrating an abnormal condition detector circuit provided in the conventional sensor circuit and including a LPF of the non-inverting type.
Figure 8:
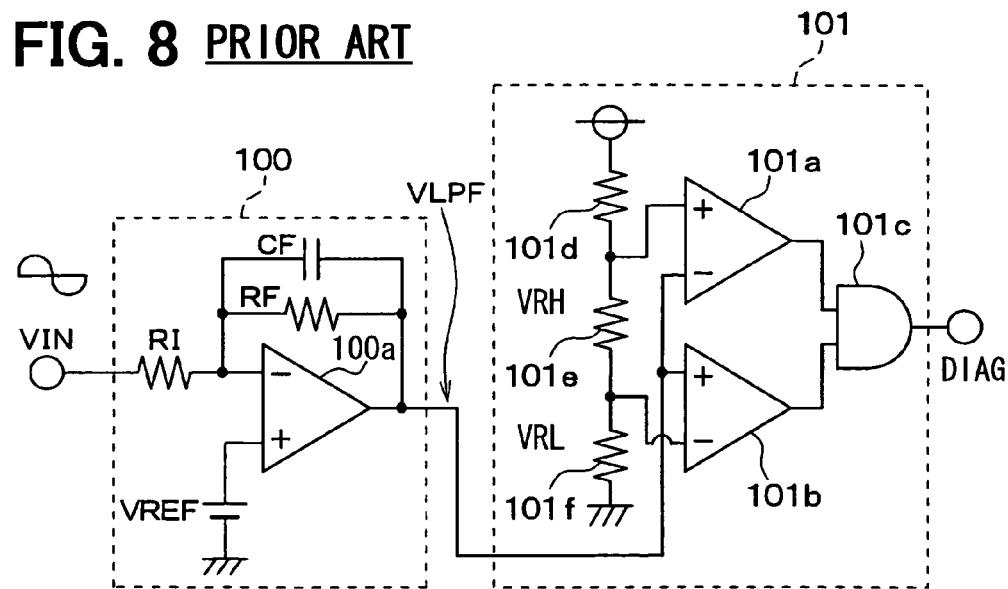
FIG. 8 is a circuit diagram illustrating an abnormal condition detector circuit provided in the conventional sensor circuit and including a LPF of the inverting type.

The third embodiment shown in FIG. 5, too, is to provide a circuit for improving the precision for detecting the DC component in the input signal VIN that occurs in the case of the first embodiment. The sensor circuit in this embodiment, too, has a similar construction as the first embodiment.

As shown in FIG. 5, the first and second resistors 45e, 45f, 46e, 46f are connected in parallel with the second capacitors 45d, 46d, and third capacitors 45h, 46h are connected between the first and second resistors 45e and 45f, and 46e and 46f. Namely, the third capacitors 45h and 46h are added instead of the third resistors 45g and 46g of the first embodiment. Further, the second operational amplifiers 45b and 46b constituting the buffer circuit in the first embodiment are removed.

In the case of the above construction, equivalent impedance ZF of the circuit constructed with the first and second resistors 45e, 45f, 46e, 46f connected in parallel with the second capacitors 45d, 46d, and the third capacitors 45h, 46h, is expressed as follows, wherein the resistances of the first and second resistors 45e, 45f, 46e, 46f are RF1 and RF2, and the capacitances of the third capacitors 45h, 46h are CN, $$ZF=j \cdot \omega d \cdot RF1 \cdot RF2 \cdot CN+RF1+RF2 \quad (13)$$

Therefore, the resistances RF1 and RF2 can be decreased since an absolute value of the equivalent impedance ZF can be increased relying upon the capacitances CN.

In the case of this construction, further, the terminals of the third capacitors 45h, 46h on the end of not connected to the first and second resistors 45e, 45f, 46e, 46f, need not necessarily be connected to the contact points serving as the upper-limit threshold value VRH or the lower-limit threshold value VRL. That is, as shown in FIG. 5, the above terminals may be impressed with the reference voltage VREF or may be connected to the contact points of a stable potential such as GND or power source voltage VCC. In the case of this embodiment, too, therefore, no second operational amplifiers 45b, 46b are necessary for constituting the buffer circuits, and the circuit is simplified. Upon fabricating the first and second resistors 45e, 45f, 46e, 46f and the third capacitors 45h, 46h in an IC chip, therefore, the area occupied thereby can be decreased. Besides, the input offset voltages of the first operational amplifiers 45a, 46a are not amplified.

The above embodiments are directed to the sensor circuits used for the gyrosensors. The invention, however, can further be applied to other sensors.

What is claimed is:

1. A sensor circuit comprising:
sensing means that produces detection signals;
voltage conversion means that subjects the detection signals to voltage conversion to produce a conversion voltage;
AC component pickup means that receives the conversion voltage and picks up an AC component in the conversion voltage;
first adder means that provides an upper-limit voltage by adding an upper-limit threshold value to the AC component;
second adder means that provides a lower-limit voltage by adding a lower-limit threshold value smaller than the upper-limit threshold value to the AC component; and
detecting means that detects an abnormal offset voltage depending upon whether the conversion voltage is in a range of normal voltages between the upper-limit voltage and the lower-limit voltage, wherein
the AC component pickup means and the first adder means form a first high-pass filter,
the AC component pickup means and the second adder means form a second high-pass filter,
the first and second high-pass filters include, respectively first operational amplifiers, first capacitors connected between terminals for receiving the conversion voltage and inverting input terminals of the first operational amplifiers, second capacitors connected between output terminals of the first operational amplifiers and the inverting input terminals of the first operational amplifiers, and first and second resistors connected in parallel with the second capacitors, so that phases of the AC component are inverted,
the conversion voltage is input to the inverting input terminals of the first operational amplifiers via the first capacitors, and the upper-limit threshold value or the lower-limit threshold value is input to the non-inverting input terminals of the first operational amplifiers,
an inverting amplifier is provided between the voltage converting means and the first and second high-pass filters for amplifying the conversion voltage in an inverted manner, and
an inverted voltage is applied to the detecting means to be compared with the upper-limit voltage and the lower-limit voltage.

2. The sensor circuit according to claim 1, wherein the voltage conversion means includes:
first and second voltage conversion means that subjects the detection signals to first and second voltages; and
differential amplifier means that takes a differential in the first and second voltages to produce a differential voltage as the conversion voltage.

3. The sensor circuit according to claim 1, wherein:
the first and second high-pass filters both include, respectively, third resistors connected between the first resistors and the second resistors, and second operational amplifiers that constitute buffer circuits; and the upper-limit threshold value or the lower-limit threshold value is input to non-inverting input terminals of the second operational amplifiers, so that the upper-limit threshold value or the lower-limit threshold value is output as an output of the buffer circuits, and the output is input to non-inverting input terminals of the first operational amplifiers as well as to the third resistors.

4. The sensor circuit according to claim 1, wherein:
the first and second high-pass filters further includes, respectively, third capacitors that apply predetermined voltages between the first resistors and the second resistors therethrough.

* * * * *